United States Patent [19]

Mortensen

[11] Patent Number: 4,691,198

[45] Date of Patent: Sep. 1, 1987

[54] CONTROL SYSTEM FOR DIVERTING/EQUALIZING ELECTRICAL POTENTIALS BETWEEN TWO OBJECTS

[76] Inventor: Alf Mortensen, "Bloksberg", Solhola, N-5300 Kleppestϕ, Norway

[21] Appl. No.: 762,150

[22] PCT Filed: Dec. 14, 1984

[86] PCT No.: PCT/NO84/00059

§ 371 Date: Jul. 24, 1985

§ 102(e) Date: Jul. 24, 1985

[87] PCT Pub. No.: WO85/02601

PCT Pub. Date: Jun. 20, 1985

[30] Foreign Application Priority Data

Dec. 16, 1983 [NO] Norway ................................ 834639

[51] Int. Cl.[4] ...................... G08B 21/00; H02H 11/00; B67D 5/32; H05F 3/00

[52] U.S. Cl. .................................... 340/649; 361/215; 361/217

[58] Field of Search .................. 340/649, 652; 324/51; 361/215, 216, 217, 220

[56] References Cited

U.S. PATENT DOCUMENTS

| | | | |
|---|---|---|---|
| 1,524,423 | 1/1925 | Chapman | 361/215 |
| 1,564,855 | 12/1925 | Jurs | 361/215 |
| 4,220,951 | 9/1980 | Bash et al. | 340/649 |

*Primary Examiner*—James L. Rowland

*Assistant Examiner*—Daniel Myer

*Attorney, Agent, or Firm*—Ladas & Parry

[57] ABSTRACT

A control system for diverting/equalizing electrical potentials between two objects, for example the shell (1) of a storage tank installation and the body (10) of a tank truck/vessel, when loading flammable/explosive fluids, wherein an electrical equalizer connection (5,6,14) connects the body (10) of the tank truck via a terminal (10*a*) to the storage tank (1) via a terminal (1*a*). The terminals (1*a* and 10*a*) are part of respective control circuits comprising a low voltage source ($U_1$; $U_2$), a resistor (4; 13) and an indicator (8,9) for registering current flow and thereby controlling/blocking the connection/disconnection of a fluid pump. To check that electrical connection has in fact been established at the terminals (1*a*,10*a*), each of these is connected to a respective control circuit via separate terminals, namely a terminal (1*b*; 10*b*) on the respective bodies (1; 10) and a terminal (*6a; 6b*) on a busbar (6) in the equalizer connection (5,6,14). A plug connector (15) with an explosion-proof switch is connected to the control circuit for the tank truck and comprises an auxiliary contact for connecting a relay (17) in the tank truck's electrical system to its body (10) such that when the plug (15) is connected, the connection between the vehicle's battery (19) and its electrical user circuits (20) will be broken, if the vehicle's main switch (18) has not been turned off. Spark formation and the possible setting off of explosive gases, as well as a planned or accidental starting of the vehicle during loading are thereby prevented.

14 Claims, 3 Drawing Figures

Figure 1:
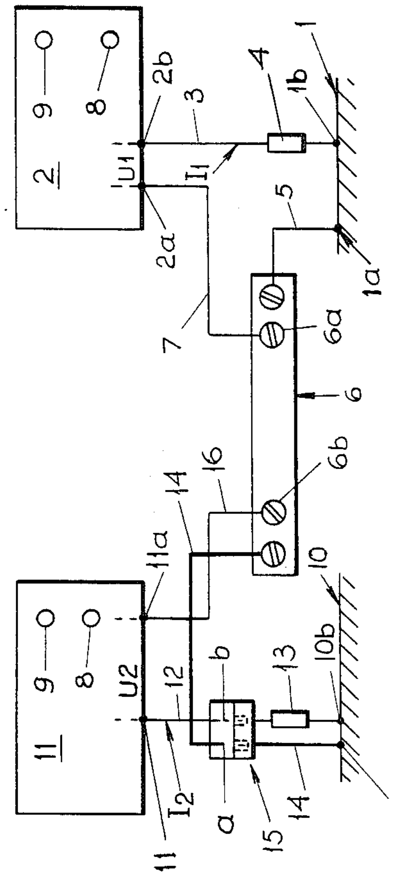

CONTROL SYSTEM FOR DIVERTING/EQUALIZING ELECTRICAL POTENTIALS BETWEEN TWO OBJECTS

The present invention relates to a control system for diverting and equalizing electrical potentials between two objects, for example the shell of a storage tank installation and the body of a tank truck/vessel, when loading flammable/explosive fluids, of the type recited in the preamble of the appurtenant, independent claim 1.

When loading a tank truck with explosive substances, the explosives control board in Norway requires, inter alia, that the main switch in the truck's electrical system must be in the "off" position, and that eletrical connection must be established between the body of the tank truck and the shell of the storage tank.

Many systems are currently in use for establishing eletrical connection of the above type, but they all lack a means for controlling that electrical connection actually has been established with the tank truck. Moreover, there is always a possibility that a busy driver could begin the loading process by starting the storage tank's fluid pump without first having switched off the truck's electrical system, thus endangering his own and his colleagues' safety. It is up to the driver to remember to turn off the main switch for the truck's electrical system.

On their inspection rounds, the explosives control authority have withdrawn the driver's licenses of tank truck drivers who have failed to observe the regulations.

In the modern systems a "crocodile"-type clamps or similar type arrangements are usually used to establish an electrical connection with the tank-truck or a delivery tank of transporting means. If the driver forgets to break the connection by removing the crocodile clamp when he has finished loading, no catastrophe results, because the contacts on the crocodile clamp will be torn loose when the truck drives away. Prior art systems can be delivered with electronic control of the truck's connection to the storage tank's "rack connection", but it is not known on the systems currently in use in Norway to provide a similar safeguard at the other end of the cable that establishes the electrical connection for equalizing electrical potentials.

However, U.S. Pat. No. 3,290,668 discloses a grounding and indicator means for checking that adequate connection has been established with the tank truck by means of a clamp with electrically insulated clamping members which are attached, e.g., to a flange or screw on the tank truck body. The two halves of the clamping means are connected to a control circuit comprising a voltage source, a resistor and an indicator which shows that current is flowing in the circuit when the clamp has been satisfactorily connected to the tank truck. This control circuit is connected to ground, but the circuit has no means for simultaneously controlling that grounding has actually been established. Said indicator will flash a green light and actuate or energize relays for starting the fluid pump when the connection is found to be in order, and will flash a red light and stop the pump if the connection has not been made and no current is flowing through the control circuit.

The object of the present invention is to provide a control system for diverting/equalizing electrical potentials between two objects, for example a tank truck and a storage tank, wherein the electrical equalizer connection is continuously monitored, and which is adapted to ensure that the tank truck's electrical system will automatically fail to receive electrical current when said electrical equalizer connection has been established.

This will make it impossible for a tank truck driver, perhaps through forgetfulness or carelessness, to place himself or his colleagues in danger during the loading of explosive substances.

The control system also includes fault indicator means which issue a warning if a plug connector is short-circuited or the contact is poor.

Since the current flowing through the electrical system of the tank truck is automatically cut off when the electrical equalizing connection is established, the truck cannot be started during the loading operation. The electrical equalizer connection must be broken before the truck can be started up.

These objects are obtained according to the invention by means of the characterizing features recited in the appurtenant independent claim 1, and in the succeeding dependent claims.

The electrical equalizer connection's terminal at the tank truck is connected to the control circuit via separate terminals located respectively on the tank truck body and on the equlizer connection itself; therefore, the known per se control circuit, owing to the flow of current through all three said terminals, will indicate that the connections are in order and that electrical connection has been established between the truck and the equalizer connection. A similar control circuit is provided at the other end of the electrical equalizer connection, thus obtaining the same control at both ends.

Figure 1A:
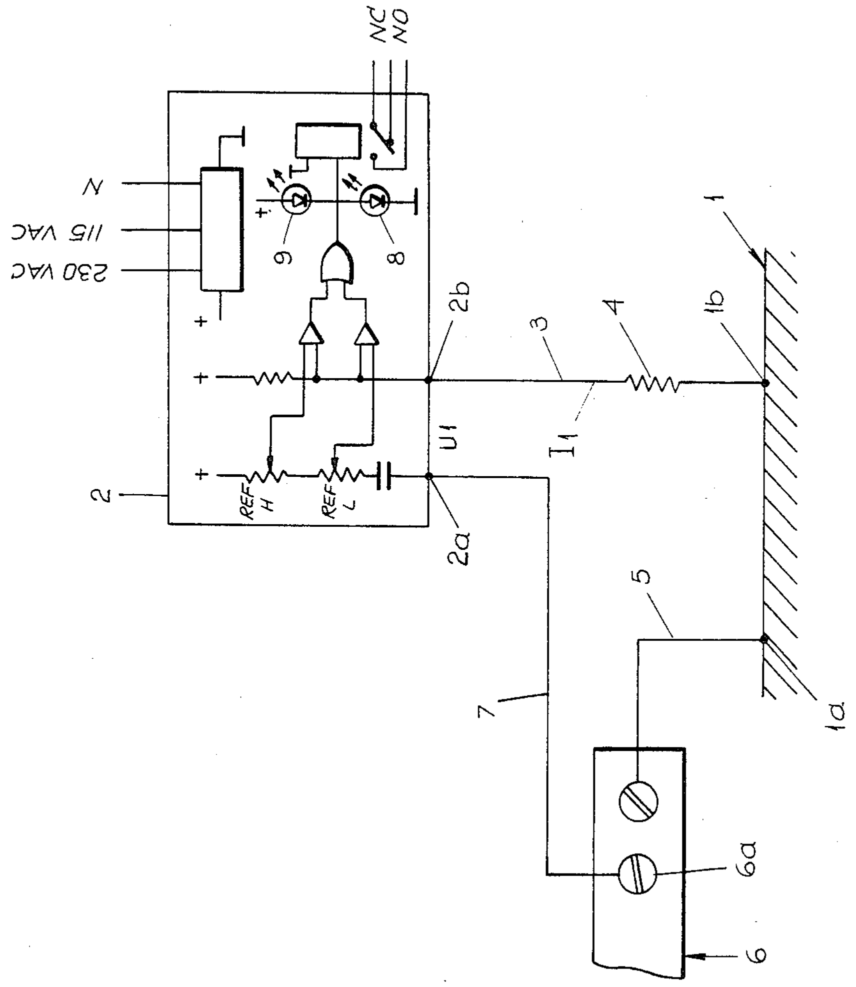
Figure 2:
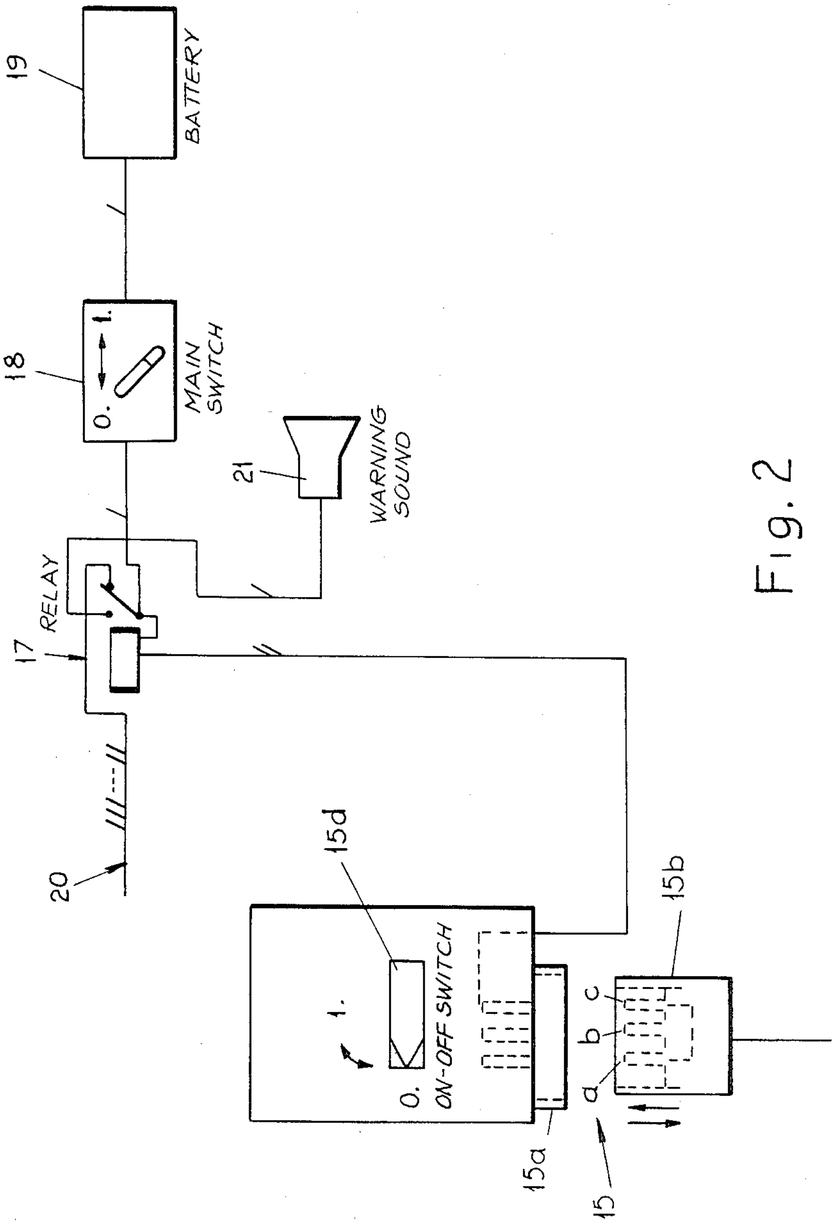

The invention will be explained further in the following with reference to the accompanying drawings, which illustrate an exemplary embodiment of the invention:

FIG. 1 is a circuit diagram of the electrical equalizer connection between the bodies of two objects and the associated control circuits, and FIG. 1A is a right hand-side portion of a circuit diagram of the electrical equalizer connection of FIG. 1 shown in more detail, and FIG. 2 is a block diagram showing how the truck's electrical system may be disconnected by means of the main switch, or optionally by a relay if the main switch has not been set in the "off" position.

FIGS. 1 and 1A show the electrical equalizer connection between the bodies of two objects, for example the body 1 of a storage tank and the body 10 of a tank truck. The equalizer connection consists in this case of an electrical busbar 6 permanently mounted on the storage tank and connected to the tank body 1 via a wire 5 at a terminal 1*a*. The other end of the busbar is connected via a wire 14 to the truck 10 at a terminal 10*a*.

A plug connector 15 is provided on the wire 14 for connecting and disconnecting the electrical equalizer connection to/from the truck 10. A control circuit is provided at each end of the electrical equalizer connection, one control circuit comprising a low voltage source $U_1$, a resistor 4 and an indicator means 8,9, and the other control circuit comprising a low voltage source $U_2$, a resistor 13 and an indicator means 8,9. The terminal 1*a* for the equalizer connection at the storage tank 1 is connected to the control circuit via separate terminals, namely a terminal 1*b* on the storage tank 1 and a terminal 6*a* on the busbar 6. The other terminal 10*a* for the equalizer connection is similarly connected to the other control circuit via separate terminals, namely a terminal 10*b* on the truck 10 and a terminal 6*b* on the busbar 6.

The terminals 1*a* and 10*a* are thus continuously monitored, because a current flows through each of the control circuits to indicate whether said terminals 1*a* and 10*a* are in fact connecting the electrical equalizer connection 5,6,14 to the bodies 1 and 10 of the storage tank and tank truck, respectively.

Each of the two control circuits also comprises a means for measuring the current flow $I_1$ and $I_2$, and a comparator which compares the measured value with predetermined values, namely a maximum and a minimum value. On the basis of these comparisons, the comparator transmits a signal to a warning means, for example a lamp 8 or 9, when the current is less than the minimum value or exceeds the maximum value. This signal can also be utilized for disconnecting the storage tank's fluid pump, thus preventing loading. If the current flow is too low, said signal will warn that at least one of the terminals has too much resistance (i.e., the terminal 1*a* or 10*a* has too much resistance relative to the body 1 or 10), which means that the electrical equalizer connection between the storage tank and the tank truck is too poor. Naturally, poor contact at the other terminals 1*b* and 6*a* or 10*b* and 6*b* can also cause said minimum current flow. In any case, all of the terminals in one or the other control circuit must be checked and corrected to obtain a correct current flow value before the fluid pump can be connected.

If the measured current value is too high, this may be due to a short-circuiting of the resistor 4 or 13 in one or the other control circuit, said resistors being respectively connected between the voltage source $U_1$; $U_2$ and the bodies 1; 10. Such a short-circuiting of the resistor 4 or 13 may result from a conscious action to obtain sufficient current in the control circuit if it shows too high resistance, in order to start the pump. This, however, will result in an excessive current value, and the fluid pump will not be able to be started.

Each control circuit and its associated electrical components with the exception of the resistors 4;13 can be gathered into a unit 2;11 with two terminals 2*a*,2*b*; 11*a*,11*b*. The terminals 2*a*,2*b* on unit 2 are connected respectively to the terminal 6*a* on the busbar 6 and via the resistor 4 to the terminal 1*b* on the storage tank 1. The terminals 11*a*,11*b* on unit 11 are similarly connected, respectively, to the terminal 6*b* on the busbar 6 and via the resistor 13 to the terminal 10*b* on the tank truck/vessel 10. Said units 2 and 11, which we may call electronic units, comprise in addition to the electrical components mentioned above in connection with each of the control circuits (such as a low voltage source, resistor and indicator means), a means for measuring the current $I_1$;$I_2$ in the respective control circuits, and a comparator which compares the measured value with predetermined values such as maximum and minimum values. The comparator may for example be arranged for sending a signal, perhaps via a relay output, to the indicator means 8,9, e.g. light diodes, when the measured current either is less than or exceeds the predetermined minimum or maximum values. As mentioned previously, this signal can also be utilized for disconnecting the fluid pump and thereby prevent loading, because the equalizer connection between the respective objects is not in the prescribed order.

The two electronic units 2 and 11, as seen in FIGS. 1 and 1A, are connected via the busbar 6 and will thus provide 100% control of the electrical equalizer connection between the bodies of the storage tank 1 and tank truck 10.

The electronics unit 2 has a low voltage source $U_2$ (alternating or direct current) which produces a current $I_1$ which is limited by the total resistance in the control circuit 3,4, 1*b*,1,1*a*,5,6,6*a* 7. The resistor 4 is adapted to and mounted in close physical proximity to the body of the storage tank 1.

The electronics unit 11 is identical to the unit 2, and it controls that an electrical connection exists between the busbar 6 and the body of the tank truck 10.

The plug connector 15 for the wires 14 and 12 in the latter control circuit preferably constitutes a known per se explosion-proof switch comprising a socket member 15*a* and a plug member 15*b*, wherein the switch must be in the "off" position to enable the plug 15*b* to be inserted into or withdrawn from the socket 15*a*. To establish electrical connection to the wires 12,14 connected to the plug and socket 15*b*,15*a*, the switch must be turned to the "on" position. This also provides a mechanical safeguard against accidental separation of the two parts 15*a*,15*b*.

A plug connector 15 of the above described type having three contacts a,b,c is utilized. Contacts a and b are used in the wire connections 14 and 12. The third auxiliary contact c, in the fixed part of the plug containing the switch, i.e., the socket 15*a* in FIG. 2, can be connected to a relay 17 mounted on the electrical system of the tank truck/vessel, which in turn is connected to the current source 19 for the electrical system. By connecting the auxiliary contact c on the plug 15*b* (the movable part) directly to the equalizer connection's contact a on the plug 15*b* the current coil of the relay 17 will be connected to the truck 10 when the plug 15*b* is plugged in and connection is then established by means of the on-off switch 15*d*.

If the main switch 18 for the truck's electrical system has not been disconnected by the driver, the current coil of the relay 17 will be energized so that its armature is actuated. Thus, the relay's contacts (which are connected between the main switch and the various user circuits in the electrical system) will be opened, and the electrical system will no longer receive current, because the connection to the electrical system's battery 19 via the main switch 18 has been broken. One of the contacts of the relay 17 which is open in the inactive position, can optionally be connected to a warning circuit so that when the contact is closed, a warning sound or light 21 will show that the main switch 18 has not been turned off.

Therefore, even if the driver forgets to turn off the main switch 18, the voltage to the various user circuits 20 will be disconnected via the resting contacts of the relay 17, thereby eliminating the risk of spark formation and possible explosion of volatile gases.

With the above-described disconnection of the electrical system either by the main switch 18 or by means of the relay 17, a planned or unplanned start of the vehicle during the loading operation is also prevented, since the start relay which is one of the user circuits 20 also is disconnected and thus cannot be actuated by turning the vehicle's ignition key or pushing a starter button or the like.

I claim:

1. A control system for diverting and equalizing electrical potentials between two objects such as a body of a storage tank and a body of a delivery tank of transporting means during loading flammable or explosive fluids, comprising an electrical equalizer connection connecting said transporting means via a terminal of the delivery tank of transporting means to the storage tank via a storage tank terminal, at least one said delivery tank and storage terminal is a part of a control circuit, said control circuit comprising a low voltage source, a resistor, indicator means for registering a current flow, said indicator means controlling and blocking connection and disconnection of a fluid pump by means of signals, said storage tank and said delivery tank of transporting means terminals are connected to the control circuit via independent control terminals including a storage tank and delivery tank control terminal of the body of the storage tank and the body of the delivery tank and a control terminal of the equalizer connection;

said equalizer connection comprising a busbar connected to the storage tank via a storage tank wire and said storage tank terminal, the equalizer connection is connected to the delivery tank of transporting means via a delivery tank wire and the terminal of the delivery tank of transporting means;

a plug connector being connected to the delivery tank wire, said plug connector having at least one extra contact for connecting the low voltage source with said transporting means via a delivery tank control wire and said resistor, a fixed part of the plug connector being mounted on the delivery tank of transporting means and a movable part of said plug connector is connected to said control wire of the delivery tank and to the wire of the delivery tank.

2. A control system according to claim 1, wherein the resistor is connected between the fixed part of the plug connector and said transporting means.

3. A control system according to claim 1, wherein an auxiliary contact member is provided on the plug connector, the auxiliary contact member is connected to the busbar via the delivery tank, and an auxiliary contact member in the fixed part of the plug connector is connected to a relay connected to the current source of the delivery tank in a such manner that when the movable and fixed parts of the plug connector are connected, the relay is energized and connection between a battery on the delivery tank of transporting means and a user circuits of the current is thereby broken by means of contacts of the relay.

4. A control system according to claim 1, wherein the control circuit comprises a current gauge for measuring the current in the control circuit, a comparator for comparing a measured value with predetermined maximum and minimum values, the comparator transmitting signals to a warning means, said comparator transmitting signals for energizing a relay for disconnecting the fluid pump when the current is less than or exceeds said minimum and maximum values.

5. A control system according to claim 1, wherein components of the control circuit are combined in a unit having at least two terminals for connection, respectively, to the control terminal for the busbar of the equalizer connection, and, via the resistor to the storage tank and delivery tank control terminal on the storage tank and said transporting means, the resistors are not including in the unit.

6. A control system according to claim 1 wherein the plug connector comprising said fixed part mounted on the delivery tank of the transporting means, said movable part is an explosiion-proof switch having a socket member and a plug member, the switch in a disconnecting position permits the insertion and withdrawal of the plug member from the socket member, and the switch in a connecting position establishes electrical connection and provides a safeeguard against accidental separation of said socket member and plug member.

7. A control system for diverting and equalizing electrical potentials between two objects such as a body of a storage tank and a body of a delivery tank of transporting means during loading flammable or explosive fluids comprising an electrical equalizer connection connecting the said transporting means via a terminal of the delivery tank of transporting means to the storage tank via a storage tank terminal, at least one said delivery tank and storage terminal is a part of a control circuit, said control circuit comprising a low voltage source, a resistor, indicator means for registering a current flow, said indicator means controlling and blocking connection and disconnection of a fluid pump by means of signals, said storage tank and said delivery tank terminals are connected to the control circuit via independent control terminals including a storage tank and delivery tank control terminal of the body of the storage tank and the body of the delivery tank, and a control terminal of the equalizer connection.

8. A control system according to claim 7 wherein said equalizer connection comprising a busbar connected to the storage tank via a storage tank wire and said storage tank terminal, the equalizer connection is connected to the delivery tank of transporting means via a delivery tank wire and the terminal of the delivery tank of transporting means.

9. A control system according to claim 8 wherein components of the control circuit are combined in a unit having at least two terminals for connection, respectively, to the control terminal for the busbar of the equalizer connection, and, via the resistor to the storage tank and delivery tank control terminal on the storage tank and said transporting means, the resistors are not included in the unit.

10. A control system according to claim 8 wherein a plug connector being connected to the delivery tank wire, said plug connector having atleast one extra contact for connecting the low voltage source with said transporting means via a delivery tank of control wire and said resistor, a fixed part of the plug connector being mounted on the delivery tank of transporting means and a movable part of said plug connector is connected to said control wire of the delivery tank and to the wire of the delivery tank.

11. A control system according to claim 10, wherein the resistor is connected between the fixed part of the plug connector and said transporting means.

12. A control system according to claim 10, wherein an auxiliary contact member is provided on the plug connector, the auxiliary contact member is connected to the busbar via said delivery tank, and an auxiliary contact member in the fixed part of the plug connector is connected to a relay connected to the current source of the delivery tank in a such manner that when the movable and fixed parts of the plug connector are connected, the relay is energized and connection between a battery on the delivery tank and a user circuits of the current is thereby broken by means of contacts of the relay.

13. A control system according to claim 10, wherein the plug connector comprising said fixed part mounted on the delivery tank of the transporting means, said movable part is an explosion-proof switch having a socket member and a plug member, the switch in a disconnecting position permits the insertion and withdrawal of the plug member from the socket member, and the switch in a connecting position establishes electrical connection and provides a mechanical safeguard against accidental separation of said socket member and plug member.

14. A control system according to claim 7, wherein the control circuit, comprises a current gauge for measuring the current in the control circuit, a comparator for comparing the measured value with predetermined maximum and minimum values, the comparator transmitting signals to a warning means, said comparator for transmitting signals for energizing a relay for disconnecting the fluid pump when the current is less than or exceeds said minimum and maximum values.

* * * * *